Jan. 1, 1935. J. D. BENBOW 1,986,387
STUB AXLE MOUNTING FOR WAGONS
Filed Oct. 27, 1930 2 Sheets-Sheet 1
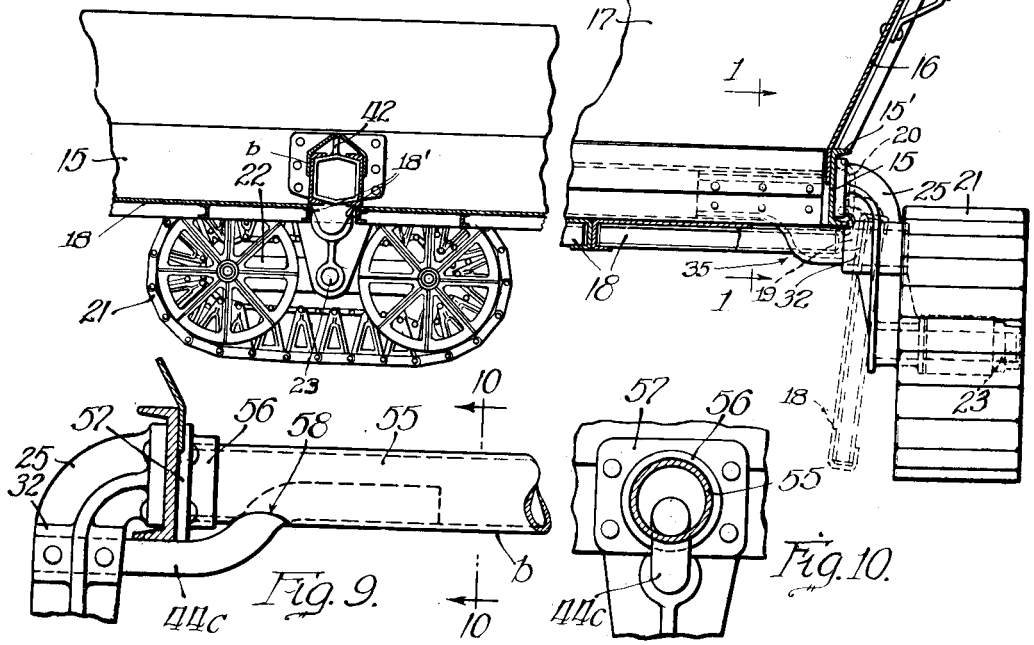
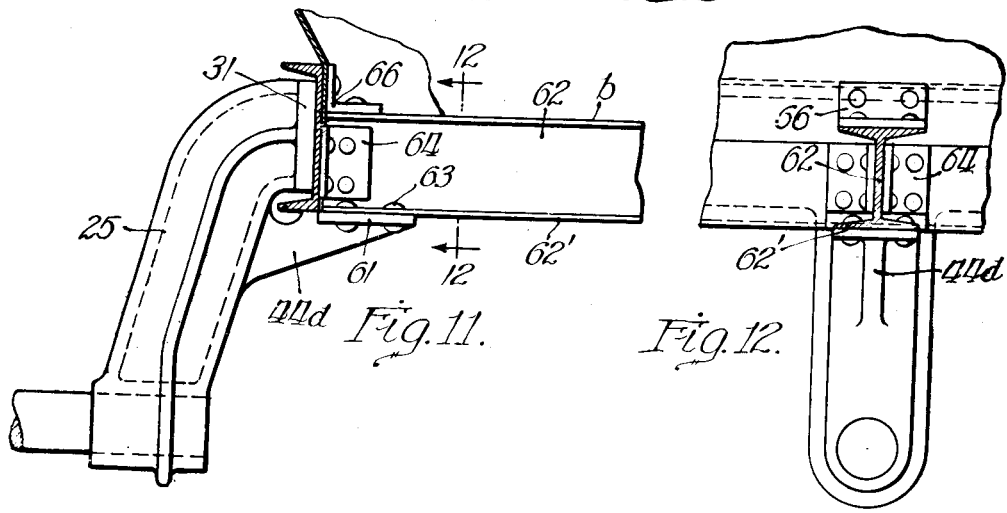
Inventor:
James D. Benbow
By Brown, Jackson, Boettcher & Dienner
Attys.

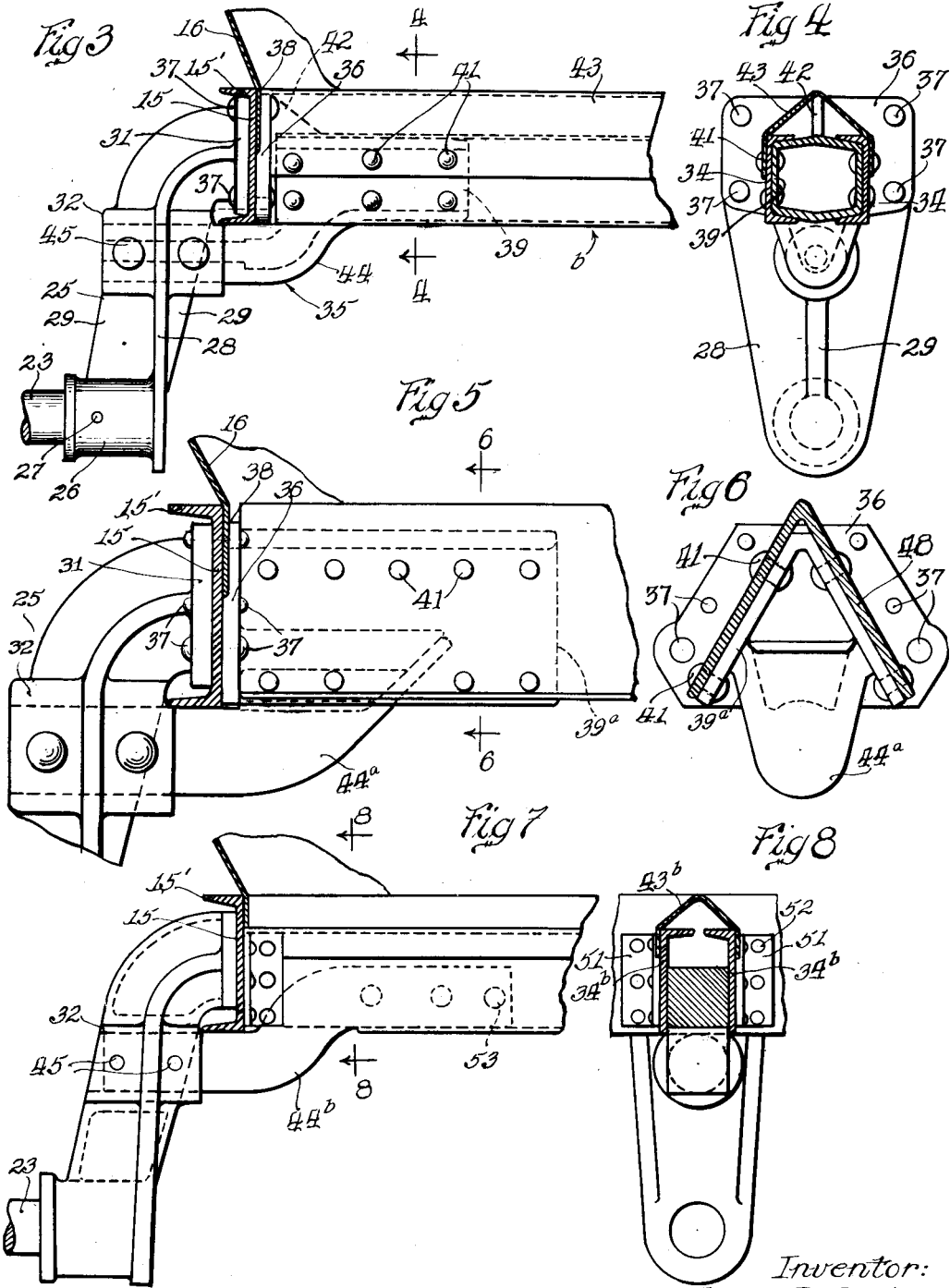

Patented Jan. 1, 1935

1,986,387

UNITED STATES PATENT OFFICE 1,986,387

STUB AXLE MOUNTING FOR WAGONS

James D. Benbow, Aurora, Ill., assignor, by mesne assignments, to Western-Austin Company, Aurora, Ill., a corporation of Illinois Application October 27, 1930, Serial No. 491,437

14 Claims. (Cl. 298—35)

The present invention relates to improvements in stub axle mountings devised primarily for dump wagons and carts of the general type disclosed in prior Patent No. 1,706,099, issued March 19, 1929, in the name of myself and James B. Green. The construction disclosed in that patent comprises a frame on which is carried an open bottom, load carrying bed having longitudinally extending dumping doors which in their closed position extend along the bottom of the bed. The frame is supported substantially midway between its ends on rolling units of the creeper tread or endless track type which are rockably supported on an arched axle structure comprising outwardly projecting stub axles disposed considerably below the main frame or bottom of the bed. It is important to have these stub axles spaced downwardly considerably from the frame in order to give sufficient clearance for the doors when dumped to clear the ground and the dumped pile of material. Because of this vertical spacing, and because a through axle is not practicable owing to difficulties in clearing the pile of material and clearing the doors, a problem arises in giving the stub axles a strong durable mounting which can carry the heavy loads imposed on the wagon without outward spreading or sagging of the stub axles, their mounting means or the frame. In the construction disclosed in the aforesaid patent a heavy reenforcing member is extended transversely between the side sills of the frame in the vertical plane of the stub axles, and bracket arms are secured to said transverse member at points inside the side sills and from which member they extend outwardly and downwardly to the stub axles. The transverse member prevents spreading or warping of the frame and the attachment of the stub axle brackets to said member securely holds the stub axles against outward spreading or sagging.

The construction herein disclosed is quite similar to that above described except that certain improved features have been incorporated therein.

One of the principal objects of the present invention is to provide an increased clearance under the wagon, laterally between the stub axle brackets and vertically between said brackets and the ground. This has a two-fold advantage in more readily clearing a dumped pile of material and in readily accommodating the use of only one pair of dumping doors wherein each door extends from end to end of the bed.

Another object of the invention is to provide a construction wherein the stub axle brackets are secured to the outer sides of the frame side sills, so that the vertical load stresses are transmitted directly between these side sills and the brackets; also to provide a construction wherein the spreading or sagging stresses are borne by reenforcing members which are joined at their inner ends to the transverse reenforcing frame member and which then extend downwardly and outwardly under the frame side sills and are joined at their outer ends to said brackets intermediate the ends of the latter. These latter reenforcing portions establish a strong diagonal tie connection between the substantially vertical portions of the axle brackets and the transverse reenforcing frame member, with the result that a strong durable construction is afforded, capable of effectively carrying all stresses, without materially reducing the frame clearance or necessitating any large weakening openings in the side sills of the frame.

A further object is to provide a stub axle mounting which is inexpensive and which lends itself to convenient and expeditious assembly operations. Other objects and advantages will be apparent from the following description of a preferred embodiment of the invention. In the accompanying drawings illustrating such embodiment:

Figure 1 is a longitudinal sectional view through a dump vehicle, corresponding to a section taken on the plane of the line 1—1 of Figure 2, showing one of the creeper tread units, and illustrating one form of the present stub axle mounting;

Figure 2 is a transverse section through one side of the wagon, illustrating this stub axle mounting in side elevation;

Figure 3 is a similar fragmentary view, on a larger scale, of this same form of mounting;

Figure 4 is a section on the plane of the line 4—4 of Figure 3;

Figures 5 and 6 are views like Figures 3 and 4, illustrating another embodiment; and Figures 7—8 and 9—10 and 11—12 are also views like Figures 3 and 4, illustrating other forms of the invention.

Referring to Figures 1 and 2, the frame of the wagon comprises two side sills 15, preferably consisting of relatively deep channel bars having their flanges 15' facing outwardly. These side sills are connected by suitable end sills at the ends of the wagon. The load carrying bed is shown as being of hopper form comprising side plates 16 secured to the inner sides of the side sills and sloping outwardly therefrom, these side plates being joined to end plates 17 at the ends of the bed. The open bottom of the bed is adapted to be closed by dumping doors 18 extending lengthwise of the bed and having hinged connection to the side sills 15 of the frame for swinging downwardly and outwardly to open position. As clearly disclosed in the aforementioned patent, the hinge connection may comprise curved hinge brackets 19 secured at spaced points along the outer edge of each door and having a pivotal and vertically slidable connection with bars 20 secured to the outer sides of the sill beams 15. The vehicle is mounted on creeper tread units generally indicated at 21, which are preferably disposed substantially midway between the ends of the load carrying bed so that these tread units carry practically all of the load. These tread units are of any conventional construction, each comprising a rocker beam 22 which is mounted for oscillating movement on a stub axle 23. Said tread units are of relatively low vertical dimension and accordingly, as will be seen from Figure 2, it is necessary to space the stub axles 23 vertically from the plane of the doors sufficiently far to enable the doors when dropped to clear the ground and also to enable them to work free from the dumped pile. At the same time the brackets which support the stub axle should not materially reduce the horizontal or vertical clearance area below the frame and between the tread units nor should they interfere with the doors, but they must nevertheless effectively resist the sagging stresses tending to spread or warp the frame or to spread the stub axles. Extending transversely between the side sills 15 in the vertical plane of the stub axles 23 and secured to said sills is a transverse reenforcing member or bolster which may assume different forms but which I have generally indicated at b in the several figures. This bolster member is disposed above the plane of the doors 18.

Referring to the construction illustrated in Figures 1 to 4, inclusive, the stub axle bracket 25 in this form comprises a lower boss 26 in which the stub axle 23 is rigidly secured, as by pins 27. The bracket arm comprises a relatively wide web portion 28 extending upwardly from the boss 26, this web portion being reenforced transversely by inner and outer ribs 29 formed integral with the web. The upper portion of the bracket arm curves inwardly and is joined to an attaching plate portion 31 formed integral with the arm. This plate portion is adapted to be secured to the outer side of the web of the adjacent side sill 15, setting between the channel flanges 15'. A horizontally disposed boss 32 is formed integrally in the bracket arm between its ends, for receiving the end of the diagonal reenforcing bracket, which I shall presently describe.

In this construction the transverse reenforcing member or bolster b comprises two channel bars 34 disposed in spaced relation with their flanges opposing each other, as shown in Figure 4. The axle bracket reenforcing member, generally indicated at 35, extends between these bolster channels 34 and the boss 32, and in this construction this reenforcing member 35 also serves to join the ends of the bolster channels 34 to the side sills 15. The member 35 comprises an attaching plate portion 36 which is secured to the inner wall of the side sill 15, the same rivets 37 which secure the outer attaching plate 31 to this side sill also passing through the inner attaching plate 36 and securing both plates to the sill. The upper portion of the attaching plate 36 has its outer surface recessed to accommodate the lower edge of the body side wall 16, as indicated at 38, the upper rivets also passing through this portion of the side wall. Projecting inwardly as an integral extension of the attaching plate 36 is a bolster attaching portion 39 substantially in the form of a hollow box-like extension. The inwardly facing flanges of the two bolster channels 34 nest or set over this box-like extension and the channels are rigidly secured thereto by the rivets 41. A strengthening rib 42 extends diagonally from the upper edge of the attaching plate 36 down to the top of the box-like extension 39. To insure spillage of the load from opposite sides of the transverse bolster b, whereby to prevent accumulations of the load material remaining thereon, a wedge-shaped plate 43 is extended across the entire length of the bolster and has its depending side portions secured to the outer sides of the channels 34.

Formed integrally with the attaching plate 36 and box-like extension 39 is a reenforcing arm 44 which extends downwardly and outwardly below the side sill 15. This arm extends outwardly through the boss 32, where it is rigidly secured by the transverse rivets 45. If desired, the arm may be cored out to reduce the weight of the casting. Where the arm 44 extends down from the bottom of the box-like extension 39, the bottom flanges of the bolster channels 34 are cut away to accommodate a width of arm substantially equal to the width of the bottom of the box portion 39.

It will be evident from the foregoing that the weight of the load is effectively borne through the attachment of the bracket 25 to the outer side of the sill beam, and that spreading stresses tending to spring the stub axle brackets outwardly are effectively resisted by the tie connection established through the arm 44 between the axle bracket and the bolster b. The attachment of this bolster to the side sills also prevents spreading of the frame at this point. The arm 44 does not materially reduce the clearance below the frame, and where a single pair of doors is employed extending from end to end of the bed it is only necessary to notch out a comparatively small portion of each door at the outer edge to accommodate the stub axle bracket and reenforcing arm. This notch area is indicated at 18' in Figure 1, and it will be seen that when the door is closed such notch area is closed off by the bottom of the transverse bolster b. This construction is also admirably adapted to the use of separate pairs of front and rear doors because the spaced relation of the two bolster channels 34 permits the door hoisting chains to be extended down between these channels intermediate the sides of the bed for establishing connection with both pairs of doors, as is fully disclosed in the aforesaid Benbow and Green patent.

The construction illustrated in Figures 5 and 6 is generally similar to the above except that the bolster b consists of a single A-shaped bar 48 and accordingly the shape of the connecting extension 39 is modified. In this construction the axle bracket 25 is secured to the outer side of the sill beam in substantially the same manner above described, and the reenforcing member 35 comprises the same general relation of attaching flange 36 and reenforcing arm 44a. The same rivets 37 which secure the attaching flange or plate 36 to the inner side of the sill beam 15 also pass through the sill beam and through the outer attaching plate 31 of the axle bracket 25, thereby securing both attaching plates to the sill in the same manner described of Figures 3 and 4. It will be understood that bolts may be employed in place of these rivets 37, if desired. The bolster attaching portion 39a of this casting is of inverted V-shape or A-shape over which the bolster bar 48 is secured by rivets 41. The arm 44a constitutes an integral extension of the attaching plate 36 and bolster attaching portion 39a, extending outwardly and downwardly from the inner part of the portion 39a, as clearly shown in Figure 6. It will be evident that this construction also has the same stress resisting characteristics as the construction above described.

In the construction illustrated in Figures 7 and 8, the transverse bolster b comprises a pair of opposing channels 34b similarly to the showing in Figure 4. In this arrangement the ends of said channels are secured to the inner sides of the sill beams by heavy angle brackets 51 which have legs riveted at 52 to the outer sides of the channels and to the inner side of the sill beam respectively. The axle bracket 25 is secured to the outer side of the sill beam substantially in the manner above described. The bracket reenforcing member comprises a heavy bar, preferably of square or rectangular cross-section, which is bent to extend downwardly and outwardly under the sill beam, the outer end of this bar having a cylindrical portion which is secured in the boss 32 by the rivets 45. The inner portion of said bar extends upwardly and inwardly between the web portions of the two bolster channels 34b, where the bar is secured by rivets 53 extending through the channels and through the bar. The bottom flanges of the channels are cut away at the ends to permit the bar 44b to be extended downwardly and outwardly under the sill beam. I have shown a separate bar section 44b as being provided at each side of the bolster, but it will be understood that a unitary bar may be extended entirely across the width of the bed with its ends bent downwardly and outwardly as shown. The channels 34b may be disposed in proximate relation as shown, or they may be spaced further apart to permit door hoisting chains to be passed down therebetween, in which case the intervening portion of the reenforcing bar 44b would be made wider to fill the space between the channel webs. A wedge-shape deflecting plate 43b is preferably secured to the upper portions of the said channels and extends from side to side of the bed to deflect the material from the top of the bolster.

In Figures 9 and 10 I have illustrated another construction in which the bolster consists of a length of heavy tubing 55 which is preferably of circular cross-section although it might be of rectangular section. Each end of the bolster tube is rigidly secured in a boss 56, as by threading, riveting or welding, and this boss is formed as an integral extension of an attachment plate 57 which is riveted to the inner side of the adjacent sill beam 15. The axle bracket 25 is secured to the outer side of the sill beam in the manner before described. The bracket reenforcing member 44c consists of a heavy bar which has its downwardly and outwardly bent end anchored in the stub-axle bracket as above described, and which has its upwardly and inwardly directed portion extending into the tube 55 through a hole 58 provided in the bottom of the tube. This bar is rigidly secured within the tube, preferably by welding between the bottom surface of the bar and the lower inner wall of the tube. The bar may be either of round or rectangular cross-section, but in either case the lower surface of the bar within the tube is preferably shaped to conform to the surface of the tube to increase the area of welded engagement between these two. Here again, I have shown the bars 44c as consisting of separate units, one at each side of the frame, but it will be evident that a single bar structure might be extended across the entire width of the frame with its ends bent downwardly and outwardly of the tube 55 as shown.

In each of the preceding forms I have shown the stub axle bracket 25 as being an element separate from the reenforcing arm 44, with the latter adapted to take into the boss 32 on the bracket. This construction is preferable for assembly reasons because it enables the bolster b and reenforcing member 44 to be disposed in place at the inner side of the sill beam, and the axle bracket to be disposed in place at the outer side of the sill beam with the arm 44 extending into the boss 32. However, it is possible in each of these constructions to make the reenforcing arm 44 an integral part of the axle bracket 25. In certain instances of this integral construction, particularly in Figures 3 to 6, inclusive, the mounting of the structure would then be effected by sliding the assembly lengthwise of the sill beam from the end thereof to the point where the stub axles are to be mounted. In each of these prior constructions illustrated in Figures 1 to 10, inclusive, the reenforcing arm 44 in passing below the bottom flange of the sill beam 15 preferably engages therewith so that part of the vertical stresses are transmitted through this base flange to the reenforcing arm which thus serves as a step or rest for the bottom of the beam.

In Figures 11 and 12 I have illustrated another form in which the reenforcing arm is constructed as an integral part of the axle bracket. The main body of the axle bracket may be made similar to the preceding embodiments or may be of any other desired construction with its attaching flange 31 riveted to the outer side of the adjacent sill beam. The reenforcing arm 44d extends inwardly as an integral projection of the bracket and has a suitable attaching portion 61 at its inner end, preferably so arranged that it can be slipped past the bottom flange of the sill beam when the bracket is secured to the outer side of the beam. In this embodiment the bolster b is of a type such as will permit convenient attachment of the arm 44d thereto, the bolster having suitable flanges for effecting this attachment, and preferably consisting of a heavy I-beam 62. The oppositely extending base flanges 62' of this beam bear on the horizontal attaching portion 61 of the reenforcing arm 44d, and rivets 63 are extended through these flanges and the attaching portion 61. Side angle brackets 64 are riveted to opposite sides of the web of the I-beam and to the inner side of the sill beam, and a top angle bracket 66 is also riveted to the top flanges of the I-beam and to the inner side of the sill beam. Sagging or spreading stresses arising in the axle brackets are transmitted through the reenforcing arms 44d to the I-beam 62 which effectively resists these stresses because of the large beam strength of the I-beam 62 against deflection under such stresses.

Having thus described my invention what I claim as new and desire to secure by Letters Patent is:

1. A dump wagon comprising a frame having longitudinal side sills, a load carrying bed supported on said sills, stub axles, brackets supporting said stub axles and secured to the outer sides of said sills, a transverse bolster extending between said sills substantially in the transverse plane of said stub axle brackets, and reenforcing arms joining said bolster and said brackets and extending under said side sills.

2. A dump wagon comprising a frame having longitudinal side sills, a load carrying bed supported by said side sills, stub axles, brackets supporting said stub axles and comprising attaching plate portions secured to the outer sides of said sills, a transverse bolster extending between said sills substantially in the transverse plane of said stub axle brackets, and reenforcing members joined at their inner ends to said bolster and extending downwardly and outwardly under said sill beams and being joined at their outer ends to said stub axle brackets intermediate the ends of the latter.

3. A dump wagon comprising a frame having longitudinal side sills, a load carrying bed supported by said side sills, stub axles, brackets supporting said stub axles and secured to the outer sides of said sills, a transverse bolster extending between said sills, and reenforcing members joining said bolster and said stub axle brackets and extending under said side sills.

4. A dump wagon comprising a frame having side sills and a transverse bolster connecting said sills, a supporting bracket adapted for attachment to the outer side of one of said sills substantially in alignment with said bolster and extending laterally outwardly and downwardly therefrom, a stub axle adjacent to the lower extremity of said bracket for mounting a ground engaging unit, and reenforcing means extending inwardly from said bracket below the adjacent side sill, providing a rest for said sill, and secured to said bolster for sustaining said bracket against sagging or spreading stresses.

5. A dump wagon comprising a frame having longitudinal side sills, a load carrying bed supported by said side sills, stub axles, brackets supporting said stub axles and secured to the outer sides of said sills with said axles spaced downwardly considerably from the bottom of said frame, a transverse bolster extending between said sills substantially in the transverse plane of said stub axle brackets, and a reenforcing member for each stub axle bracket comprising an attaching plate secured to the inner side of the adjacent side sill, an extension portion secured to said transverse bolster, and an arm extending downwardly and outwardly below the side sill and joined to the stub axle bracket.

6. A dump wagon comprising a frame having longitudinal side sills, a load carrying bed supported by said sills, stub axles, brackets supporting said stub axles and secured to the outer sides of said sills, a transverse bolster comprising flanged bars extending between said side sills approximately in the transverse plane of said stub axle brackets, and a casting for reenforcing each stub axle bracket, each casting comprising an attaching plate portion secured to the inner side of the adjacent side sill, a box-like extension projecting inwardly therefrom and having the flanged bars of said bolster secured thereto, and an arm extending downwardly and outwardly below the adjacent side sill and being joined at its outer end to the stub axle bracket.

7. A dump wagon comprising a frame having longitudinal side sills, a load carrying bed supported by said side sills, stub axles, brackets supporting said stub axles and secured to the outer sides of said sills, a transverse bolster of A-shaped cross-section extending between said sills substantially in the transverse plane of said stub axle brackets, and a casting for reenforcing each bracket comprising an attaching plate secured to the inner side of the adjacent side sill, an inward extension of A-shaped cross-section to which said bolster is secured, and an arm extending downwardly and outwardly below the adjacent side sill and being joined at its outer end to said stub axle bracket.

8. A dump wagon comprising a frame having longitudinal side sills, stub axles, brackets supporting said stub axles and secured to the outer sides of said sills, a transverse bolster comprising two bars extending between said sills substantially in the transverse plane of said stub axle brackets, and means for reenforcing the brackets at each side of the frame comprising a bar secured between the bars of said bolster and bent downwardly and outwardly below the adjacent side sill and joined to said stub axle bracket.

9. A dump wagon comprising a frame having longitudinal side sills, a load carrying bed supported by said side sills, stub axles, brackets supporting said stub axles and secured to the outer sides of said sills, a transverse bolster comprising two bars extending between said sills substantially in the transverse plane of said stub axle brackets, angle brackets securing the ends of said bolster bars to the inner sides of said sills, and reenforcing arms secured to said bolster bars and extending outwardly below said side sills and being joined to said stub axle brackets.

10. In a dump wagon an open-bottom body having side members, a brace member extending across the body between its side members, a bracket member on the outside of each side member and having an arm extending downwardly therefrom and carrying a stub shaft, the portions of said brace and bracket members at each body side member having flanges extending over a substantial area of the body side member and lying in registration with each other on opposite sides of the side member, and securing means connecting said flanges.

11. In a dump wagon an open-bottom body having side members, a brace member extending across the body between its side members, a bracket member on the outside of each side member and having an arm extending downwardly therefrom and carrying a stub shaft, the portions of said brace and bracket members at each body side member having flanges extending over a substantial area of the body side member and lying in registration with each other on opposite sides of the side member, and securing means connecting said opposed flanges, and comprising tie means extending therethrough and through the intervening body side portion, whereby the brace and bracket members with the side member portions therebetween are confined in arched axle form.

12. In a dump wagon, an open bottom body having side members, a brace member extending across the body between its side members, a bracket member on the outside of each side member and having an arm extending downwardly therefrom and carrying a stub shaft, the terminal portions of said brace and bracket members at each body side member having abutment portions extending transversely to the brace member over an extended area of the body side member and lying in registration with each other on opposite sides of the said member, and securing means connecting said abutment portions below the plane of the neutral axis of stress of the brace to confine the body side members with and between the brace and bracket members in arched axle form.

13. In a dump wagon having an open-bottom body with side members, arched axle means for supporting the body in elevated position, and comprising a rigid brace member extending across the body and provided at each end with an abutment presented to a side member thereof, a bracket located on the outside of each side member and provided with an abutment presented thereto opposite the corresponding abutment of said brace and having a portion extending downwardly from the body and carrying a stub shaft, and means securing each bracket to its corresponding end of the brace below the central plane of the brace, whereby the intervening body side member will be clamped between the corresponding opposed abutments as the axle is loaded.

14. In a dump wagon having an open-bottom body with side members, arched axle means for supporting the body in elevated position, and comprising a rigid brace member extending across the body and provided at each end with an abutment presented to a side member thereof, a bracket located on the outside of each side member and provided with an abutment presented thereto opposite the corresponding abutment of said brace and having a portion extending downwardly from the body and carrying a stub shaft, and means securing each bracket to its corresponding end of the brace below the central plane of the latter, and comprising tie means arranged below said plane and extending between the opposed abutments and through the body side member therebetween.

JAMES D. BENBOW.